March 28, 1961 A. H. ROSHON, JR., ET AL 2,977,568
FREQUENCY-MODULATED ECHO RANGING EQUIPMENT
Filed May 17, 1951
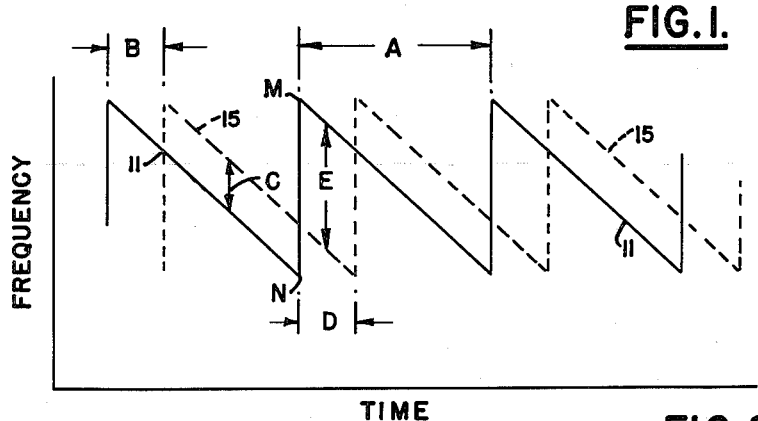
FIG.I.
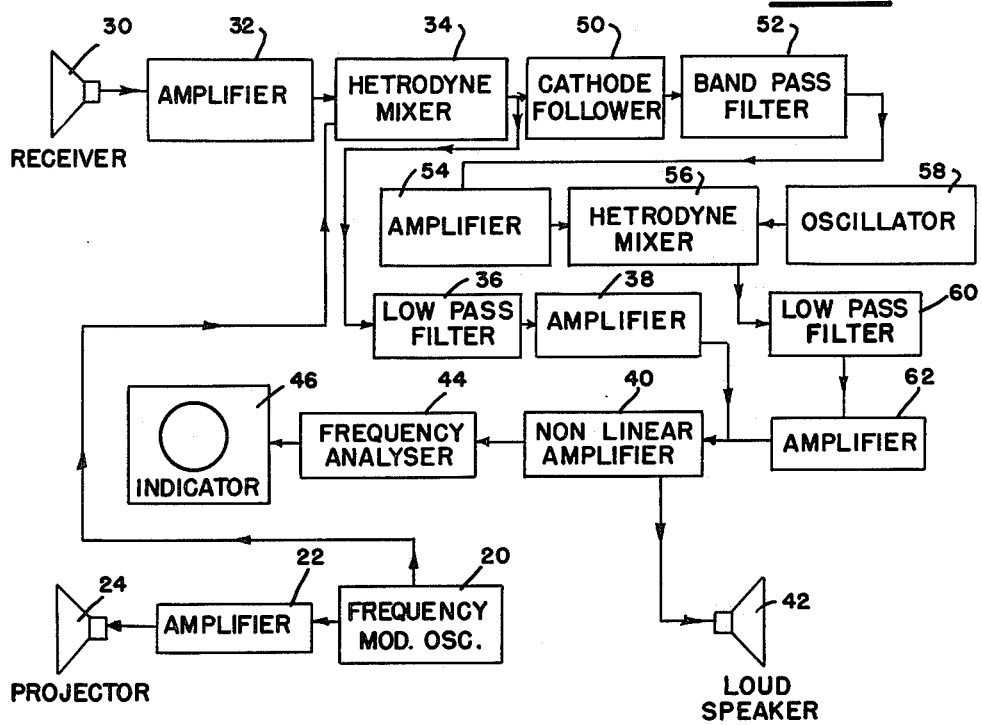
FIG.2.
INVENTORS
ARTHUR H. ROSHON, JR.
ROBERT L. WALDIE
BY
ATTORNEYS

2,977,568

FREQUENCY-MODULATED ECHO RANGING EQUIPMENT

Arthur H. Roshon, Jr., San Diego, and Robert Lee Waldie, Coronado, Calif., assignors to the United States of America as represented by the Secretary of the Navy Filed May 17, 1951, Ser. No. 226,924

7 Claims. (Cl. 340—3)

(Granted under Title 35, U.S. Code (1952), sec. 266)

The device herein described may be manufactured and used by or for the Government of the United States of America for governmental purposes without the payment of any royalties thereon or therefor.

The present invention relates to frequency modulated echo ranging systems and more particularly to sonic ranging systems which produce a continuous target indication.

The echo ranging systems used in the past for locating underwater objects have operated on the principle of transmitting sound energy in the direction of the target and receiving a portion of the transmitted energy which is reflected back from the target. Since sound waves in ocean water travel at a substantially constant rate of about 1600 yards per second, the difference between the time of transmission of the sound energy and the time of reception of the reflected energy provides an accurate measure of the range to the target. Some of those ranging systems transmitted a series of discrete pulses separated in time from each other by an interval more than the transit time of the energy to and from a target at the maximum range of the equipment, and since the propagation rate of sound in ocean water is slightly less than a mile per second, the spaces between pulses must be several seconds. Such a system is therefore capable of searching an area only at very low speeds, although the operating range may be quite considerable.

However, for many applications, the slow rate of search of the pulsed sonic echo systems is a distinct disadvantage in maintaining contact with targets at short ranges, and to overcome these disadvantages, frequency modulated systems have been devised. These systems employ a continuously radiating oscillator whose frequency is caused to vary cyclically between fixed limits. The reflected energy has the same frequency as the energy impinging on the target, and is combined with the output of the oscillator to produce a heterodyne or beat frequency. It will be apparent to those skilled in the art that the reflected energy will be delayed by the transit time to and from the target, and will therefore be of a different frequency than that of the oscillator, and that the difference between the two frequencies will be a measure of the distance to the target. However, because of the time delay introduced in the reflected area, the energy reflected by the target during one cycle of operation is combined with the oscillator energy of the succeeding cycle for a period of time equal to the transit time of the reflected energy. The range indications produced by the apparatus during the interval of time required for transmitted energy to travel to the target and return at the beginning of each cycle are therefore inaccurate and cannot be used as range indications. It will also be readily apparent that this time interval, which will hereinafter be called "lost time," will be an appreciable time interval, since the transit time of the energy at a range of only one mile is two seconds. If the cyclic rate of the oscillator is made high, the "lost time" may substantially equal the cycle time, and even if the cycle time is made long with respect to the transit time at the maximum range required, it will still be a large percentage of the total cycle during which the apparatus is useless. Where submarines must pass through mine fields, the "lost time," during which the ranging apparatus is inoperable, becomes most dangerous, because the submarine must pass within a short distance of the mine without striking it. Under these conditions, any "lost time" may cause a collision and hence the destruction of the vessel, and is, at best, disconcerting to the crew of the vessel.

In order to overcome the "lost time" in frequency modulated sonic echo ranging equipment, the present invention provides a second heterodyne frequency of the same accuracy as the conventional heterodyne frequency during the "lost time" interval so as to provide a continuous range indication.

It is an object of the present invention to provide a sonic echo ranging system producing a continuous range indication.

It is a further object of the present invention to provide a means for eliminating "lost time" in frequency modulated sonic echo ranging equipment.

It is a still further object of the present invention to provide a sonic echo ranging apparatus producing two distinct sequential range indications.

It is a further object of the present invention to provide a sonic echo ranging apparatus producing a first heterodyne signal during conventional operation and a second heterodyne signal during the "lost time" period.

Further objects and advantages of the present invention will be made more apparent by reference to the following description and to the appended drawings in which Fig. 1 is a graph showing the operation of the device; and Fig. 2 is a block diagram of the present device.

Referring now to Fig. 1 of the drawings, the curve 11 represents the frequency of the energy transmitted by the echo ranging apparatus, and it will be observed that the curve has the shape of a sawtooth wave which has gradual linear rate of change from a maximum frequency to a minimum frequency and then quickly returns to the maximum frequency. The time interval for one cycle is indicated by the symbol A.

The dashed curve 15 indicates the frequency of the reflected energy received by the apparatus. This curve has a shape similar to that of curve 11, but lags the curve 11 by the time interval B, which is the transit time of the sound energy to the target and return. The displacement of the curve 15 relative to the curve 11 is proportional to the range of the target from the apparatus, and produces a difference between the frequency of the oscillator and the reflected energy, or as herein called the range frequency, indicated by the vertical line C. It is apparent that the length of the arrow C is constant over most of the cycle. However, within the area indicated by D, the frequency of the reflected energy continues to decline although the frequency of the oscillator has increased to the maximum frequency at the beginning of the succeeding cycle. The range frequency so produced, represented by the vertical arrow E, is vastly different from the frequency represented by the arrow C, and is therefore useless to indicate the target range. The time interval represented by D is the "lost time" heretofore mentioned and is equal to the time interval represented by B.

An inspection of Fig. 1 will show, however, that the sum of the frequency C and the frequency E is equal to the frequency deviation of the oscillator in each cycle, represented by the line MN. Therefore, if the frequency E is subtracted from a constant frequency equal to the frequency range MN, the difference frequency will be equal to the frequency C. The difference between the frequency E and the frequency range MN is equal to the frequency C only during the period D, and if this frequency and the frequency C are consecutively applied to the indicating apparatus, a continuous range indication results.

In the design of actual equipment, it is necessary to make the time interval A several times longer than the transit time of the sound energy when reflected from a target at the maximum range of the apparatus to prevent any ambiguity in range. Ambiguities result when the transit time exceeds the time A, so that energy transmitted on one cycle is received more than a cycle later and appears on the apparatus as considerably shorter than the actual range. For this reason, it is usual to employ a cycle time of about 10 seconds for each mile of expected range. However, even for this short range equipment, it will be noted that the "lost time" period may be 2 seconds or 20% of the operating cycle.

A box diagram of echo ranging equipment is shown in Fig. 2. The oscillator 20 is of any convenient type and may be frequency modulated by means of a reactance tube controlled by a sawtooth generator or may be a positive-bias multi-vibrator controlled by a sawtooth generator. While the frequency range employed is a matter of design, a suitable range may have a maximum frequency of 48 kilocycles and a minimum of 36 kilocycles, thus producing a frequency deviation of 12 kilocycles per cycle. The cyclic period may be adjusted to 12 seconds so as to produce a linear variation in frequency of 1000 cycles per second, although the cyclic rate of the deviation is also a matter of design.

The output of the oscillator 20 excites the amplifier 22 which increases the power of the signal to a suitable level to drive the projector 24 mounted in the water. The projector may be of any suitable type, such as a piezo-electric crystal and the radiation pattern of the projector 24 may have any desired directional characteristics, but in general should confine the radiated energy to the area to be scanned.

The receiver 30 is adapted to respond to sound energy striking it and is positioned in the water near the projector 24. The receiver 30, like the projector 24, may be of any desired type, such as the usual hydrophone or a crystal microphone. However, the receiver 30 should have a relatively sharp directional pattern so as to accurately indicate the bearing from which the reflected sound energy arrives. The receiver 30 is connected to the input of the electronic amplifier 32 which increases the signal to a desired level.

The output of the amplifier 32 is fed to a heterodyne mixer 34 into which is also injected a portion of the output of the oscillator 20. The mixer 34 may be of the type commonly employed in superheterodyne radio receivers, or may be a ring modulator, or variator type. The exact design of the mixer is not important except that it must produce an output frequency equal to the difference between the two impressed frequencies.

The output of the mixer 34 is impressed on a low pass filter 36, which sharply attenuates frequencies higher than the range frequency at the maximum desired range of the apparatus. If the maximum range for which the apparatus is intended is one mile and the rate of change of the oscillator frequency is 1000 cycles per second, the cut-off frequency of the low pass filter 36 should be 2000 cycles per second, since the transit time is 2 seconds at this range. The filter is of conventional design and is per se no part of the invention. A conventional amplifier 38 is used to increase the voltage level of the filter output, although the amplifier may be omitted if the output is sufficiently large.

It is desirable that the reflected signals received by the apparatus should be amplified to approximately the same level regardless of the range of the target, and since the ocean diffuses and absorbs the sound energy, the signals from the longer ranges are considerably weaker than from short ranges. The frequency at the output of amplifier 38 increases with the range and it is possible to secure a reasonably flat output characteristic from a non-linear amplifier 40 which provides approximately 24 decibel greater gain at the cut-off frequency of the filter 36 than at a frequency of 500 cycles. The design of this amplifier 40 is very similar to the conventional bass-cut tone controls employed in audio amplifier design and is well-known to those skilled in the art.

The output of the non-linear amplifier 40 is fed to a loudspeaker 42 or other suitable device which provides an audible signal for the operator and to the analyser 44. The analyser 44 may consist of a plurality of band pass filters which separate the output of the amplifier 40 into a plurality of discrete signals covering different portions of the frequency spectrum, and sequential switching means to consecutively connect the output of the several band-pass filters to the indicator 46.

The indicator 46 may employ a cathode ray tube to which is applied a radial sweep voltage synchronized in direction with the direction of the receiver 30, and synchronized in time with the electronic switch means in the analyser 44.

A fuller description of the analyser circuit heretofore described may be found in application No. 520,667 for Echo Ranging System filed February 1, 1944, by Charles A. Hisserich, now Patent No. 2,724,817. Since these circuits in themselves form no part of the invention, it is thought that further explanation is not necessary herein.

The receiver 30 and/or the projector 24 may be repetitiously turned to scan a desired area in well-known fashion. An example of a suitable scanning arrangement might include a wide angle projector which remains in a fixed position while a receiver having a very sharp directional characteristic is scanned over the arc covered by the projector. However, a highly directional projector scanned over the area covered by a fixed broad characteristic receiver may also be employed, if desired.

From the foregoing discussion it will be apparent that the circuit heretofore described herein will produce range and direction indications of targets within the range of the apparatus, but that there will be periods of two or more seconds in each cycle in which no indication is obtained. In order to overcome the "lost time," the output voltage of the heterodyne mixer 34 is combined in the heterodyne mixer 56 with a signal from the oscillator 58 to produce a beat frequency having, during the "lost time" period in each cycle, the same characteristics as the range signal. The heterodyne mixer 56 may be of any desired type and may, if desired, be similar to the heterodyne mixer 34 previously described.

The oscillator 58 is adjusted to produce a frequency equal to the frequency deviation of the oscillator 20, and may be of any desired type, such as a free-running multi-vibrator, or a self-excited or crystal controlled oscillator. The stability and frequency of the oscillator 58 will, of course, effect the accuracy of the apparatus, and the design and adjustment thereof must be suitable for producing a stable signal.

The output of the heterodyne mixer 56 is passed through a low-pass filter 60 having the same characteristics as the low-pass filter 36. The output of the low-pass filter 60 is amplified by the amplifier 62 and fed into the non-linear amplifier 40 where it is amplified in the same manner as the output of the amplifier 38 previously discussed.

It will be clear from the foregoing description that an output from the amplifier 62 occurs only during the time no output occurs from the amplifier 38, and vice versa. Thus the two signals are alternately applied to the non-linear amplifier 40 and produce a continuous output therefrom, and all "lost time" is eliminated.

It is important that the oscillator 20 and the oscillator 58 be well isolated from each other so as to prevent undesired beat notes, since such beat notes will appear on the indicator as phantom targets. Most types of oscillators produce harmonics and because the frequency of the oscillator 20 varies over a wide range, beat notes may be produced by harmonics beating with fundamentals or with other harmonics. For this reason, the heterodyne mixer 56 is connected to the heterodyne mixer 34 through a cathode follower circuit 50 which prevents feed-back through the circuit. In addition, a band-pass filter 52 is inserted between the cathode follower circuit 50 and the heterodyne mixer 56 to eliminate all but the desired range of frequencies so that harmonics are suppressed to a large extent. An amplifier 54 is included to compensate the circuit for the losses in the cathode follower circuit 50 and the band-pass filter 52.

In determining the frequency range to be passed by the band-pass filter 52, it is necessary to consider the remainder of the apparatus and its function. The range of frequencies passed by the filter 60 must be substantially the same as that passed by the filter 36, and therefore the band-pass filter 52 should pass a range of frequencies substantially equal to the frequency of the oscillator 58 less the characteristics of the filter 60. For example, if the frequency of the oscillator 58 is 12 kc. and the filter 60 passes the frequencies from near zero to 2 kc., the band-pass filter 52 should pass a band of frequencies from 10 kilocycles to substantially 12 kilocycles. The design of the band-pass filter 52 is old and well-known to those skilled in the art. No description is needed other than to explain the determination of the desired cut-off frequencies for the required apparatus.

The cathode follower 50 is connected between the heterodyne mixer 34 and the band-pass filter 52 to prevent any transfer of power from the oscillator 58 to the amplifier 38, and the amplifier 54 is inserted to compensate for the losses introduced in the circuit.

It will be obvious to those skilled in the art that many changes and modifications may be made in the apparatus disclosed. The range of frequencies employed, the cyclic rate of frequency variation, and the power of the transmitter may all be varied over wide limits. The type of individual circuits employed may be changed as desired, and the indicating system may be modified to suit the particular needs of an installation.

Having thus described the invention, what is claimed is:

1. In a frequency modulated echo ranging system emitting a continuous radiated signal having a cyclic frequency deviation over a predetermined frequency range, means for producing a range signal having a low frequency over a first portion of the cycle and a higher frequency over a second portion of the cycle, the sum of said high and low frequencies being equal to the frequency deviation of said signal, and indicator means responsive to frequencies below a frequency corresponding to a predetermined maximum range to indicate ranges, the improvement which comprises a mixer connected to receive said range signal, an oscillator connected to said mixer and having a constant frequency equal to the frequency deviation of said radiated signal, and means for introducing the output of said mixer into said indicator, whereby said higher frequency is converted to said lower frequency and said indicator produces a continuous range indication.

2. In electrical apparatus alternately producing a first frequency and a second frequency, the sum of said first and second frequencies being constant, a first path adapted to receive said first frequency, a second path adapted to receive said second frequency, an oscillator producing a constant frequency equal to the sum of said first and second frequencies a mixer connected to said second path and to said oscillator for producing an output having a frequency equal to the difference between said oscillator and said second frequency, and means for receiving the output of said first path and the output of said mixer, whereby to produce a continuous output having a frequency equal to said first frequency.

3. In electrical apparatus producing a signal alternately having a first variable frequency and a second variable frequency, the sum of said first and second frequencies being constant and said first frequency being lower than said second frequency, a first circuit connected to receive said signal and having a low-pass filter therein to pass said first variable frequency but reject said second variable frequency, a second circuit comprising a band-pass filter which passes said second frequency and rejects said first frequency, an oscillator having a constant frequency equal to the sum of said first and second frequencies, a mixer for combining said second frequency with the frequency of said oscillator, and means for connecting said first circuit and said second circuit to a single output circuit whereby to produce a continuous signal having the first frequency.

4. In frequency modulated echo ranging equipment producing a range signal alternately having a first frequency and a second frequency, the sum of said first and second frequencies being constant, a first circuit connected to receive said range signal and containing a low-pass filter adapted to pass said first frequency and to reject said second frequency, a second circuit connected to receive said range signal comprising a filter adapted to pass said second frequency and reject said first frequency, an oscillator having a constant frequency equal to the sum of said first and second frequencies, a mixer connected to combine said second frequency and the frequency of said oscillator to produce a frequency equal to said first frequency, and indicator means connected to said first and second circuits to produce a continuous indication.

5. In electrical apparatus comprising a first mixer for alternately producing a first frequency and a second frequency, the sum of said first and second frequencies being constant, a first path connected to said first mixer and adapted to receive said first frequency, a second path connected to said first mixer and adapted to receive said second frequency, an oscillator producing a constant frequency equal to the sum of said first and second frequencies, a second mixer connected to said second path and to said oscillator for producing an output having a frequency equal to the difference between said oscillator frequency and said second frequency, means in said second path interposed between said first mixer and said second mixer for preventing feedback therebetween, and means for receiving the output of said first path and the output of said second mixer, whereby to produce a continuous output having a frequency equal to said first frequency.

6. In electrical apparatus comprising a first mixer for producing a signal alternately having a first frequency and a second frequency, the sum of said first and second frequencies being constant and said first frequency being a lower than said second frequency, a low-pass filter, a first circuit connected to said first mixer for receiving said signal and having said low-pass filter therein to pass said first frequency and reject said second frequency, a band-pass filter, a second circuit connected to said first mixer and having said band-pass filter therein for passing said second frequency and rejecting said first frequency, an oscillator having a constant frequency equal to the sum of said first and second frequencies, a second mixer connected in said second circuit and to said oscillator for combining said passed second frequency and said constant sum frequency to produce a difference frequency equal to said first frequency, means in said second circuit for preventing feedback between said mixers, and an output circuit connected to said first and second circuits for receiving said passed first frequency and said difference frequency therefrom respectively, whereby to produce a continuous signal having said first frequency.

7. In frequency modulated echo ranging equipment comprising a first mixer for producing a range signal alternately having a first frequency and a second frequency, the sum of said first and second frequencies being constant, a first filter connected to said first mixer for passing said first frequency and rejecting said second frequency, a cathode follower connected to said first mixer, a second filter connected to said cathode follower for passing said second frequency and rejecting said first frequency, an oscillator having a constant frequency equal to the sum of said first and second frequencies, a second mixer connected to said oscillator and said second filter for combining said second frequency and said oscillator frequency to produce a difference frequency equal to said first frequency, said cathode follower preventing feedback between said mixers, and indicator means connected to said first filter and to said second mixer for combining said first frequency and said difference frequency to produce a continuous indication.

References Cited in the file of this patent

UNITED STATES PATENTS

| | | |
|---|---|---|
| 2,405,134 | Brown | Aug. 6, 1946 |
| 2,536,771 | Rost | Jan. 2, 1951 |